United States Patent [19]
Murphy

[11] Patent Number: 6,031,624
[45] Date of Patent: Feb. 29, 2000

[54] METHOD AND APPARATUS FOR ADAPTIVE DATA BUFFERING IN A PARALLELIZED PRINTING SYSTEM

[75] Inventor: David William Murphy, Lexington, Ky.

[73] Assignee: Lexmark International, Inc., Lexington, Ky.

[21] Appl. No.: 08/926,781

[22] Filed: Sep. 8, 1997

[51] Int. Cl.[7] ............................. B41B 15/00; B41J 15/00; G06F 15/00
[52] U.S. Cl. .......................................... 358/1.17; 395/116
[58] Field of Search ...................... 347/61; 395/111–116; 358/300, 1.12–1.17

[56] References Cited

U.S. PATENT DOCUMENTS

| | | | |
|---|---|---|---|
| 4,048,625 | 9/1977 | Harris, Jr. et al. | 364/900 |
| 4,158,235 | 6/1979 | Call et al. | 364/900 |
| 4,224,869 | 9/1980 | Morin | 101/93.04 |
| 4,298,954 | 11/1981 | Bigelow et al. | 364/900 |
| 4,315,312 | 2/1982 | Schmidt | 364/200 |
| 4,378,588 | 3/1983 | Katzman et al. | 364/200 |
| 4,578,689 | 3/1986 | Spencer et al. | 347/129 |
| 4,780,815 | 10/1988 | Shiota | 364/200 |
| 4,965,748 | 10/1990 | Chang et al. | 364/519 |
| 4,977,519 | 12/1990 | Chang et al. | 364/519 |
| 5,038,277 | 8/1991 | Altman et al. | 364/200 |
| 5,046,039 | 9/1991 | Ugajin et al. | 364/900 |
| 5,093,904 | 3/1992 | Sasaki et al. | 395/116 |
| 5,115,493 | 5/1992 | Jeanblanc et al. | 395/117 |
| 5,125,096 | 6/1992 | Brantley, Jr. et al. | 395/800 |
| 5,130,986 | 7/1992 | Doshi et al. | 370/94.1 |
| 5,179,662 | 1/1993 | Corrigan et al. | 395/250 |
| 5,185,853 | 2/1993 | Cheng et al. | 395/115 |
| 5,197,128 | 3/1993 | Campbell et al. | 395/275 |
| 5,206,932 | 4/1993 | Chang et al. | 395/165 |
| 5,265,209 | 11/1993 | Kageyama et al. | 395/102 |
| 5,276,781 | 1/1994 | Chang et al. | 375/116 |

(List continued on next page.)

Primary Examiner—Amelia Au
Assistant Examiner—F. E. Cooperrider
Attorney, Agent, or Firm—Frederick H. Gribbell, Esq.; D. Brent Lambert

[57] ABSTRACT

An improved non-stop, constant velocity laser printer is provided which operates in parallel to both begin printing a particular page of print media while virtually simultaneously receiving further data for that same page from a host computer. Since the communications link between the host computer and the printer is slower than the rate of consumption by the printhead provided with this printer, a certain amount of data for each page is first buffered in the printer before the print media begins to move via the printer's print engine. Since it is important for the printer to receive all of the required data for the entire page before the printhead requires that data for consumption, the printer must decide how much data of that particular page should be buffered within the printer before commanding the print engine to start moving the print media. The printer is capable of making this "data size" to be buffered decision without any assistance from the host computer that is sending the print job to the printer-all the host need send is the standard page header information that all host computers send when transmitting a rasterized print job to a printer. The printer bases its "data size" decision by estimating the amount of data by using the print resolution, an estimate of the compression ratio, and other information from the page header that provides a rough estimate as to how much of the area of the page of the print media is to be covered, and by estimating the communication link speed, and the amount of time that is available to perform the data transfer. Since print data is received in packets, as each packet is received, stored, and acknowledged by the printer before another packet is sent by the host, the amount of time for all of this to occur for each packet is analyzed to calculate an estimate of the approximate data transfer rate of the communications link, which is refined after receiving each new packet, but is recalculated for each new page.

16 Claims, 3 Drawing Sheets

U.S. PATENT DOCUMENTS

| | | | |
|---|---|---|---|
| 5,289,470 | 2/1994 | Chang et al. | 370/94.1 |
| 5,301,275 | 4/1994 | Vanbuskirk et al. | 395/250 |
| 5,303,347 | 4/1994 | Gagne et al. | 395/250 |
| 5,313,582 | 5/1994 | Hendel et al. | 395/250 |
| 5,355,151 | 10/1994 | Yoshida et al. | 347/61 |
| 5,381,528 | 1/1995 | Brunelle | 395/250 |
| 5,382,968 | 1/1995 | Endoh | 346/153.1 |
| 5,412,780 | 5/1995 | Rushton | 395/250 |
| 5,440,692 | 8/1995 | Janicek | 395/700 |
| 5,442,747 | 8/1995 | Chan et al. | 395/164 |
| 5,444,827 | 8/1995 | Briggs et al. | 395/115 |
| 5,479,587 | 12/1995 | Campbell et al. | 395/116 |
| 5,490,237 | 2/1996 | Zimmerman et al. | 395/115 |
| 5,557,751 | 9/1996 | Banman et al. | 395/250 |
| 5,566,208 | 10/1996 | Balakrishnan | 375/240 |
| 5,566,315 | 10/1996 | Milillo et al. | 395/440 |
| 5,627,653 | 5/1997 | Nakazato | 358/300 |

METHOD AND APPARATUS FOR ADAPTIVE DATA BUFFERING IN A PARALLELIZED PRINTING SYSTEM

TECHNICAL FIELD

The present invention relates generally to printing equipment and is particularly directed to laser printers of the type which receive rasterized print data from a host computer. The invention is specifically disclosed as a laser printer which receives print data that is separated by page headers, and in which the print engine begins printing a particular page before the print data for that entire page has been received at the printer.

BACKGROUND OF THE INVENTION

In conventional constant-velocity laser printers, once the print engine begins print a particular page, it becomes impossible to halt the movement of the sheet of print media without causing an error. For this reason, most conventional laser printers must accumulate all of the data required to generate an entire page to be printed before the print engine actually begins movement of a sheet of print media for that particular page. This typical situation is a "serial" system, since all of the print data must first be received at the printer, and then the physical printing process for that page can be initiated by the print engine.

It is possible to improve the performance of a laser printer by designing a constant-velocity printer that has a parallelized system, in which the print engine begins its task of printing a particular sheet of print media before all of the print data has been received at the printer for that same page. In other words, there are two processes occurring virtually simultaneously, the printing of the page and the receiving and processing of later portions of data for that same page. Of course, in non-stop constant-velocity print technologies (such as in laser printers) a parallelized printing system can result in a race condition. Since the paper begins to move before all the data is received, and since the paper cannot be slowed or stopped, a burden is placed on the communications link between the host computer and printer to deliver the data to the printer and arrange for it to be sent to the print engine before that data is consumed by the printhead. If the required data is not resident in the printer at the time it is to be consumed, a "link overrun" situation occurs, which is an error state.

One solution to this problem would be to develop a data transfer protocol that can deliver data to the printer faster than the data is consumed by the printhead. While this would solve the link overrun problem, it is not feasible for many systems. This would be particularly true for laser printers having a relatively low-power microprocessor in which the preferred mode of operation is to rasterize the print data at the host computer, and then transfer the print data in a bitmap format down to the printer. In this system, there will obviously be a large quantity of data that needs to be transferred from the host to the printer, and this will take some time even at a very high data transfer rate.

Another solution to the link overrun problem is to accept the fact that the communication link is slower than the rate of consumption by the printhead, but to first accumulate a certain amount of data into a buffer of the printer for each page to be printed, and then allow the print engine to start printing the page before the remaining print data for that page has been received at the printer. This will give the communications link a "head start" in its race with the printhead. To optimize such a system, the quantity of data to be buffered before starting the print engine becomes a very important criterion, because if an insufficient quantity of data has been buffered before starting the print engine, then the communications link between the host and printer will lose the race with the printhead. On the other hand, if the printer designer is too conservative, then a much larger buffer than optimal will be used before starting the print engine, thereby causing an inefficient use of the printer's rather limited RAM (Random Access Memory).

One such printer is described in U.S. Pat. No. 5,490,237 (by Zimmerman), which discloses a page printer that allowed the print engine to start printing a page before the entire page of print data has been received from its host computer. The Zimmerman printer has an I/O buffer that is used to hold some of the data for a particular page to be printed. When used in a "sleek mode" (where the host computer rasterizes the print data), the Zimmerman printer is able to start printing a particular page before the entire print data for that page has been received at the printer. Once placed in the sleek mode, the Zimmerman printer begins to accumulate print data into an I/O buffer which holds some of the data for this page that is about to be printed. Once a certain amount of print data has been accumulated in this buffer (when it exceeds a "threshold"), the print engine is instructed to start printing that page. The "threshold" is set by the host computer, by precalculating a table that is automatically accessed upon an initial system configuration that is performed by the host computer. The threshold is provided by the host computer as part of a data header that is sent to the printer along with the command to enter the sleek mode. This threshold value defines the amount of working I/O buffer that is to be allocated in the printer's RAM for use as an initial buffer to hold print data before the print engine is started. The Zimmerman printer's buffer threshold value is set by the host computer in accordance with the print speed of the laser print engine, the rate of data transfer from the host to the printer, and the resolution of the print engine for this document.

One major drawback of Zimmerman's system is that the host computer must first determine what the threshold value of the buffer size at the printer should be for each page to be printed, and then send that threshold data value to the printer in a data message at the beginning of new page. The printer itself is rather helpless to perform in a parallelized manner unless it receives this information from the host computer. The practical effect in this type of system is that host computer must know everything about the printer (including its printhead processing speed) it is sending print jobs to, and if a particular printer has been upgraded or replaced by a higher speed printer, then the efficiency of the system becomes much less than optimal, because the higher performance printer could be optimized at a much lower threshold value.

It would be a significant improvement to provide a printer that can decide for itself how much data should be buffered for a particular page to be printed, and then make its own decision as to when to start the print engine. This would alleviate some of the processing tasks that would otherwise have to be performed by the host computer, and would also eliminate any non-efficiencies that might otherwise crop up when a particular printer is upgraded or is replaced by a higher-performance device.

SUMMARY OF THE INVENTION

Accordingly, it is a primary object of the present invention to provide a printer that operates in a parallelized manner in which the print engine is started while some of the print data is still being received by the printer for the same page that is to be printed.

It is another object of the present invention to provide a printer that analyzes the page header information that is typically sent by a host computer for each page of print data being transmitted to the printer, and from this information, the printer dynamically determines on a page-by-page basis how much print data should be buffered before allowing the print engine to begin moving the sheet of print media.

It is a further object of the present invention to provide a printer that can approximate the amount of time that is available to receive the remaining portions of the print data for a particular page to be printed by first analyzing the processing speed of the printer's microprocessor system and the printer's print engine rate of data consumption, and then compare that time to the communications link data rate between the printer and its host computer that is downloading the print job, and from this information dynamically determine how much print data should be buffered for this particular page before starting the print engine.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved printer is provided which operates in parallel to both begin printing a particular page of print media while virtually simultaneously receiving further data for that same page from a host computer. Since the communications link between the host computer and the printer is slower than the rate of consumption by the printhead provided with this printer, a certain amount of data for each page is first buffered in the printer before the print media begins to move via the printer's print engine. In a preferred embodiment, the printer is a laser printer using a non-stop, constant velocity printing technique, so it is important for the printer to receive all of the required data for the entire page before the printhead requires that data for consumption. Therefore, the printer must decide how much data of that particular page should be buffered within the printer before commanding the print engine to start moving the print media.

As noted above, it is critical to determine how much print data should be buffered for each page in the printer of the present invention, and this is determined by estimating the communication link speed, the total amount of data that will be downloaded for this particular page being printed, and an estimate of the amount of time that is available to perform the data transfer. Since print data is received in packets, as each packet is received, stored, and acknowledged by the printer before another packet is sent by the host, the amount of time for all of this to occur for each packet is analyzed. Using the size of the data packet and the actual transfer time, an estimate can be made of the approximate data transfer rate of the communications link. As each subsequent packet for a particular page is received, the timing data for that packet is combined with the timing data from the previously received packet for that page, and the data transfer speed is refined. In order to facilitate different drivers, the transfer speed is not carried over from page-to-page, but instead is recalculated for each new page.

To approximate the amount of data that is to be transferred for a particular page, there are two methods used by the printer of the present invention. If the host computer already knows how much print data is to be sent (which, for bitmap print data, typically is compressed data), it can inform the printer of that fact when it is sending the header information that is transferred to the printer at the beginning of each page. If this information is not available from the host, the printer can estimate the amount of data by using the print resolution, an estimate of the compression ratio, and other information from the page header that provides a rough estimate as to how much of the area of the page of the print media is to be covered.

Another important parameter in the printer of the present invention is an estimate of the amount of time the printer has to receive the data for this page, which can be obtained by measuring the vertical distance from the topmost black pel to the bottommost black pel, which is information gleaned from the page header information. By combining this information with the process speed of the print engine, an estimate of the amount of time the printer has to receive the remaining portions of the page print data can be determined.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 2:
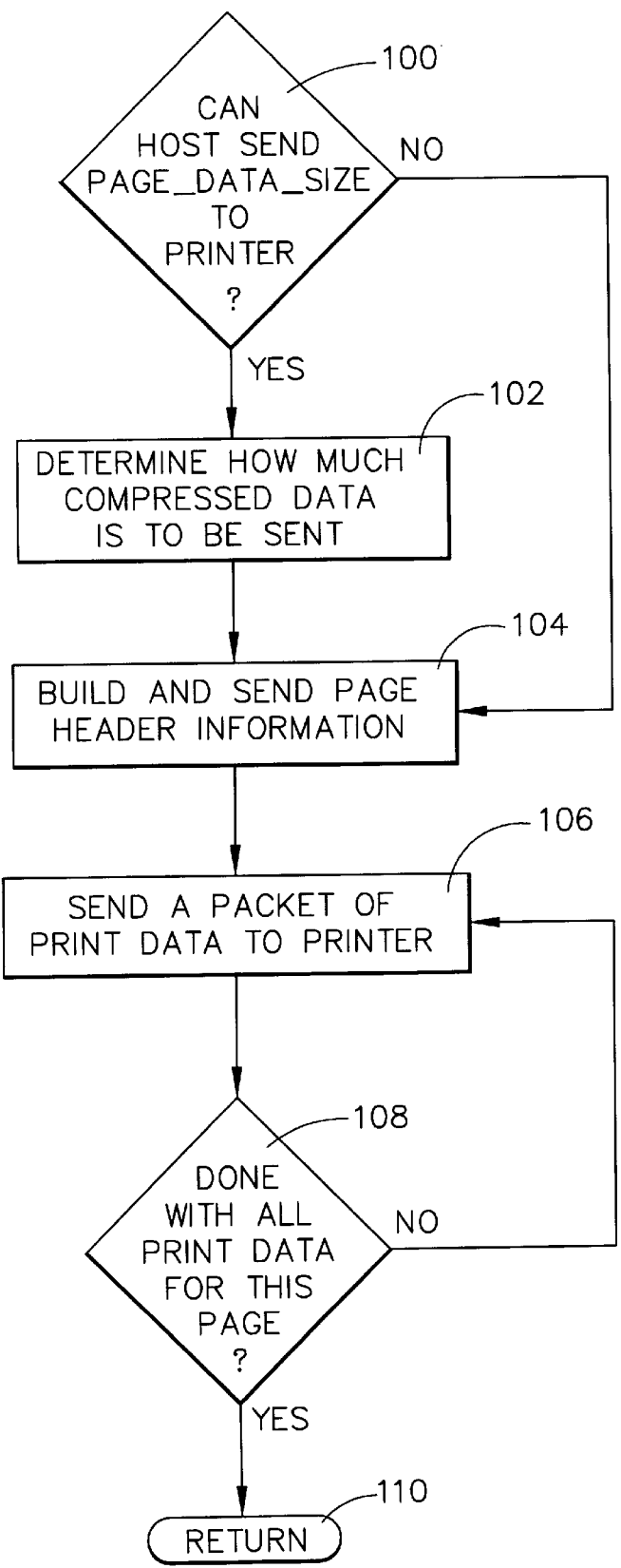
FIG. 2 is a flow chart that describes the logical operations that are performed by a host computer that interfaces with the printer of FIG. 1.

Referring now to the drawings, FIG. 2 shows a hardware block diagram of a laser printer generally designated by the reference numeral 10. Laser printer 10 will preferably contain certain relatively standard components, such as a DC power supply 12 which may have multiple outputs of different voltage levels, a microprocessor 14 having address lines, data lines, and control and/or interrupt lines, Read Only Memory (ROM) 16, and Random Access Memory (RAM), which is divided by software operations into several portions for performing several different functions.

Figure 1:
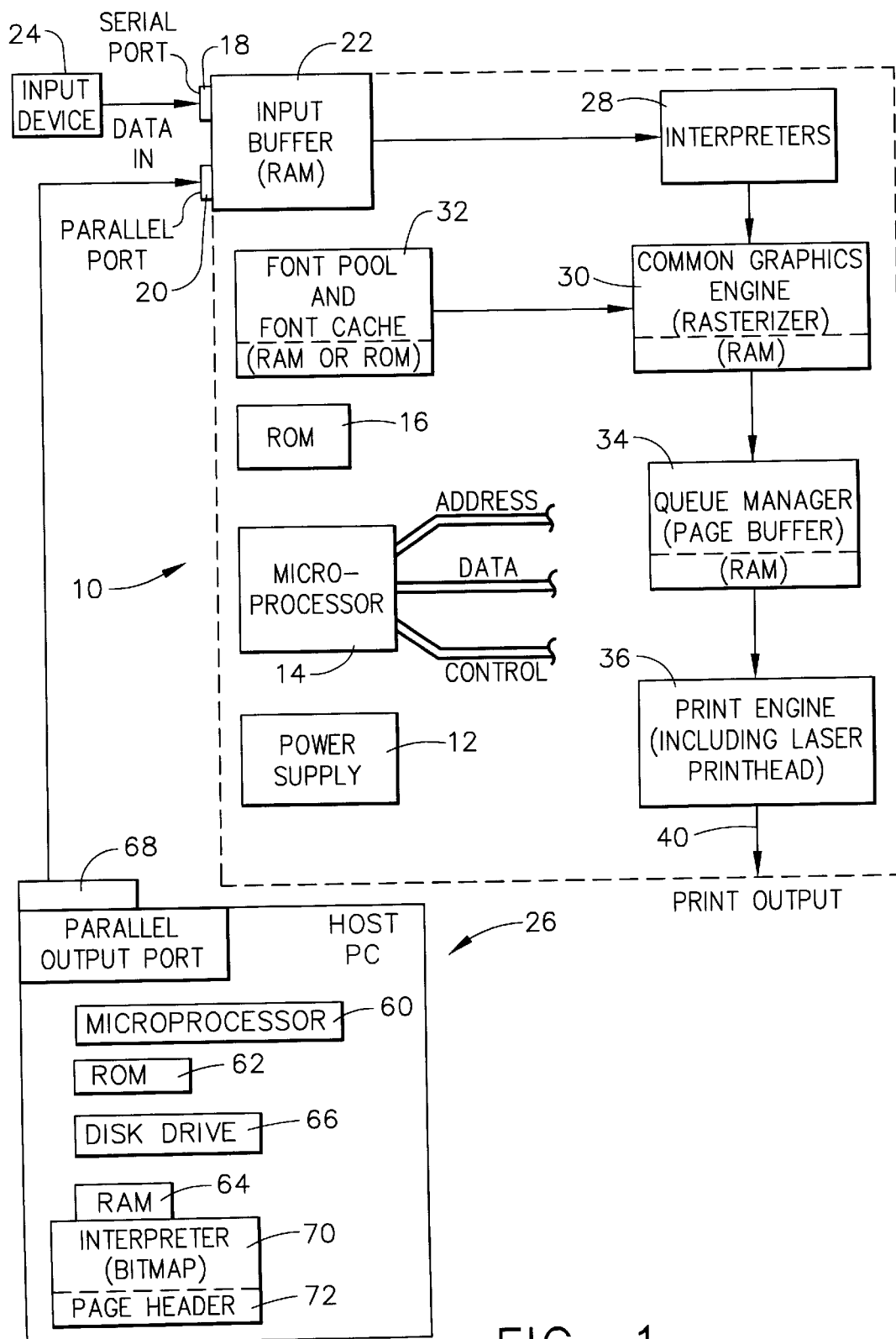
FIG. 1 is a block diagram of the major components of a printer, as constructed according to the principles of the present invention.

Laser printer 10 also contains at least one serial input or parallel input port, or in many cases both types of input ports, as designated by the reference numeral 18 for the serial port and the reference numeral 20 for the parallel port. Each of these ports 18 and 20 would be connected to a corresponding input buffer, generally designated by the reference numeral 22 on FIG. 1. Serial port 18 would typically be connected to a serial output port of a personal computer or a workstation that would contain a software program such as a word processor or a graphics package or computer aided drawing package. Similarly, parallel port 20 could be connected to a parallel output port of the same type of personal computer or workstation containing the same types of programs. Such input devices are designated, respectively, by the reference numerals 24 and 26 on FIG. 1.

Once the text or graphical data has been received by input buffer 22, it is commonly communicated to one or more interpreters designated by the reference numeral 28. A common interpreter is PostScript®, which is an industry standard used by most laser printers. After being interpreted, the input data is typically sent to a common graphics engine to be rasterized, which typically occurs in a portion of RAM designated by the reference numeral 30 on FIG. 1. To speed up the process of rasterization, a font pool and possibly also a font cache is stored, respectively, in ROM or RAM within most laser printers, and these font memories are designated by the reference numeral 32 on FIG. 1. Such font pools and caches supply bitmap patterns for common alphanumeric characters so that the common graphics engine 30 can easily translate each such character into a bitmap using a minimal elapsed time. Of course, if the incoming print data has already been rasterized by the host computer, then interpreter 28 will not need to further operate on this data to convert it into a bitmap.

Once the data has been rasterized, it is directed into a queue manager or page buffer, which is a portion of RAM designated by the reference numeral 34. In a typical laser printer, an entire page of rasterized data is stored in the queue manager during the time interval that it takes to physically print the hard copy for that page. The data within the queue manager 34 is communicated in real time to a print engine designated by the reference numeral 36. Print engine 36 includes a laser light source within its printhead, and its output 40 is the physical inking onto a piece of paper, which is the final print output from laser printer 10.

It will be understood that the address, data, and control lines are typically grouped in buses, which are electrically conductive pathways that are physically communicated in parallel (sometimes also multiplexed) around the various electronic components within laser printer 10. For example, the address and data buses are typically sent to all ROM and RAM integrated circuits, and the control lines or interrupt lines are typically directed to all input or output integrated circuits that act as buffers.

As related above, the input device 26 is also a host computer, such as a standard personal computer (PC) that runs a word processing program to create a data file that later can be printed. The host computer 26 would contain the standard computer components, such as a microprocessor 60, Read Only Memory (ROM) 62, Random Access Memory (RAM) 64, and non-volatile disk storage media 66, such as a hard disk drive. The word processing file typically would be created under the control of a computer program stored on the disk drive 66, and the data file created by the word processing program typically would also be stored on the hard disk drive 66.

When it is time for printing a word processing data file, the print job data is sent to a parallel output port 68, and then communicated over a data link to the printer's parallel port 20. Of course, when using parallel port technology, this data link would typically be a relatively short parallel printer cable.

Before the word processing file is sent to the printer 10, the file must be prepared for interfacing to this printer. In many host computer and printer combinations, the print data file will be sent to the printer as a high-level language file using a page description language (PDL), such as PostScript®, which is a very compact way to send print data, inasmuch as the quantity of PDL data bytes is very small compared to the number of data bytes required to create a bitmap that ultimately is needed by the printhead of printer 10.

As an alternative, however, the host computer 26 can "rasterize" the print job itself, rather than having this rasterization processing occur at printer 10. In this situation, a print data interpreter 70 is provided at host computer 26, which is controlled by software residing on the host computer 26. As the print job for this word processing file is interpreted and rasterized, a bitmap is created by the interpreter 70, and the resulting bitmap is temporarily stored in RAM 64 of host computer 26. In standard word processing programs and printer driver programs, the bitmap for an entire page will be created before any portion of the bitmap for the next page begins to be created. In addition, a page header is created by the word processing program and printer driver program at host computer 26, and this page header information (depicted as reference numeral 72) is temporarily stored in RAM 64 at host computer 26.

When host computer 26 is ready to begin sending print data to printer 10 for a particular page to be printed, the host will initially send page header 72, and then the initial print data information of the bitmap 70 in the form of a print data packet for this page. Since a bitmap contains such a large quantity of data for a typical page (especially when considering today's high-resolution printers that can print a resolution of 600 dpi (dots per inch) or greater), more than one packet of print data must be sent to be able to communicate all the information needed for a single page.

As each packet of page print data is received at printer 10, it will first be received into the input buffer 22 of printer 10. Since this print data has already been rasterized, there is no need for the printer's interpreters 28 to perform any particular work except to pass the print data through to the common graphics engine 30. Even at this point, no real work needs to be performed, although the printer must eventually decompress this bitmap data, since host computer 26 would typically compress all of the bitmap information for the entire page that has been rasterized by its interpreter 70. This decompression could occur under the control of software at printer 10 at any of the stages of print data processing before reaching the print engine 36. In other words, any one of the interpreters 28, common graphics engine 30, or queue manager 34 could take control of the incoming bitmap data and cause it to be decompressed. In the alternative, the decompression of this print data could be handled by a separate hardware decompression module (not shown), which would input each of the page data packets sent by host computer 26 and received at input buffer 22, and then ultimately transfer the decompressed bitmap print data to print engine 36.

The description of the operations of host computer 26 up to this point mainly includes functions that must occur when used with any type of printer that is capable of receiving rasterized bitmap print data from an external device. As related to the present invention, the information in page header 72 that is provided by host computer 26 can be inspected by printer 10 to make the printer's operation much more efficient, by essentially operating in parallel to virtually simultaneously receive print data for a particular page to be printed while also initiating the physical printing operation of that same particular page. These functions of printer 10 will be described in greater detail hereinbelow with respect to the flow chart of FIG. 3. With regard to the operations of host computer 26, the flow chart of FIG. 2 provides greater information, immediately below.

In FIG. 2, the logical operational steps used in the present invention to send a page of rasterized print data from the host computer 26 are depicted. Starting with a decision block 100, the computer program in the host computer determines whether or not the host 26 is configured to send a variable named "Page_Data_Size" to the printer 10. In conventional host computer-printer systems, this particular variable will not be available at the host computer to send to the printer. Therefore, assuming the result is NO at decision block 100, the logic flow is directed to a function block 104 that builds the page header information and sends that to the printer. This mode of operation will be referred to herein as "Mode 1."

At step 104, the page header information is built and sent to the printer to inform the printer of certain important parameters needed so the printer can properly format and print this particular page. When operating in Mode 1, this page header information will consist of at least the following information:

(1) Paper size (e.g., letter, legal, A-4, B-5, etc.).

(2) X-resolution (e.g., 300 dpi, 600 dpi, 1200 dpi).

(3) Y-resolution (e.g., 300 dpi, 600 dpi, 1200 dpi).

(4) Input source (e.g., paper tray 1, tray 2, manual input).

(5) Output source (e.g., top output bin).

(6) Top margin of page (e.g., in terms of absolute position).

(7) Y-extent of page (e.g., in terms of absolute position).

Once printer 10 obtains this page header information, it can calculate certain important parameters related to the present invention. For example, the printer's paper transport speed will become known based upon the X-resolution and Y-resolution values. In addition, the vertical length of the portion of the page to actually be printed with black pels can be determined from the parameters that specify the top margin of the page and the Y-extent of the page.

All of the parameters listed above are typically available from any host computer that is capable of rasterizing print data and transferring that print data to a printer. When the printer 10 of the present invention operates in Mode 1, it will determine for itself exactly when enough print data has been accumulated in its buffer for the particular page that is about to be printed, and then at the proper moment initiate the paper movement of that same page through the print engine. Printer 10 can do this even though it has received no specialized information from host computer 26 that would help it to make this decision in a more simplified manner. The method for making this initial paper movement decision will be discussed in greater detail with respect to FIG. 3, below.

After host computer 26 builds and sends the page header information, a function block 106 sends a packet of print data to the printer 10. After that occurs, a decision block 108 determines whether or not the host computer 26 has finished sending all of the print data for this particular page. If the answer is NO, then the logic flow is directed in a control loop back to decision block 106 where the next packet of print data for this page is sent to the printer. Once the answer becomes YES at decision block 108, the logic flow is directed to return from this routine at step 110.

At step 106, the host computer sends a "packet header" at the beginning of each packet of print data that is being sent to printer 10. As part of this packet header, a variable named "Packet_Data_Size" is sent to the printer, which informs the printer 10 of the quantity of print data that will be contained in the instant packet of print data that will immediately follow. Printer 10 will send a response to the host computer 26 to acknowledge the receipt of this packet, which preferably also will include a message informing the host computer 26 of the current status of printer 10, so that any type of communications error that the printer perceives would be reported back to the host computer 26, and which may require the host computer to transmit the same packet information all over again before continuing on to the next packet of information for that same page. Printer 10 will also keep track of the amount of time required for the data packet to be transmitted and received at the printer, including this acknowledgment message generated by the printer. This aspect of the present invention will be discussed in greater detail below, relating to FIG. 3.

At decision block 100, if the result was YES the logic flow is directed to a function block 102 that determines how much compressed print data is to be sent for this particular page. Host computer 26 can determine this parameter, which is given the variable name "Page_Data_Size," by more than one method, however, the preferred method is to take the uncompressed bitmap data for this page, then compress that data, and finally measure the actual size of the resultant compressed data. In this manner, the precise number of Kbytes of compressed data that represents this particular page will be known at the printer once this information has been received by printer 10.

The mode of operation in which host computer 26 determines the Page_Data_Size variable will be referred to as "Mode 2" hereinbelow. When operating in Mode 2, the Page_Data_Size variable will be added to the page header information that is built and sent at function block 104 to printer 10. By providing this information, it will be easier for the printer to calculate the proper moment to initiate operation of its print engine while still receiving print data for a particular page, as will be described below in greater detail.

It is preferred that host computer 26 compress the bitmap print data for each page of every print job before sending it to printer 10. However, if it is desired to send uncompressed bitmap print data from host computer 26 to printer 10, then the printer interface software residing at host computer 26 could be modified to instead send uncompressed bitmap data and, at function block 102, to determine how much uncompressed data is to be sent for this particular page to be printed. In this circumstance, the printer will need to be informed as to whether or not the host computer 26 is sending compressed or uncompressed data, and this information could be passed to the printer as another parameter that could be added to the page header by host computer 26. For example, an additional variable sent by host computer 26 could represent the "type of compression" being used to send this print job, at least for this particular page. If the "type" of compression is equal to "none", then the printer will know that the bitmap data that will become resident in the printer for this particular page will be uncompressed, and the printer can assume a compression ratio of 1.00. Of course, if more than one type of compression is available at host computer 26, then the type of compression used could be given a particular name or numeric value to be transmitted to the printer, and printer 10 may assume a different compression ratio depending upon the designation of the type of compression used by host computer 26.

As another optional feature, the exact compression ratio for each page of print data could also be transmitted to printer 10 in the page header at function block 104. By providing this information, in conjunction with the Page_Data_Size, as is typical in Mode 2 of operation for host computer 26, the printer will know precisely not only how much compressed data is being received for this particular page, but also how much uncompressed print data will result for this page after the printer decompresses the print data. This more precise information will allow the printer to make a very accurate decision as to when to command the print engine to print this particular page.

One fairly uncontrollable variable in the host computer-printer system of the present invention is the effective data transmission rate between host computer 26 and printer 10. While printer 10 generally will know the data transmission rate after it receives the page header and the first packet of print data for a particular page, the host computer generally does not know what the data transfer rate is, at least not at the host's printer driver program. Of course, data transmission errors will tend to slow down the effective data transmission rate, so it is best to use a somewhat conservative approach in determining when the printer's print engine should initially begin printing a particular page as the print data for that page is still being received at printer 10.

Since the printer 10 can determine how much data it has received and over what time interval, it can "estimate" what the effective transfer rate shall be when receiving a particular print job from a particular host computer. As will be discussed in greater detail below, this estimate of the data transfer rate can be refined as further data packets are received for each page of print data. The printer can either measure the actual size or the incoming data as it is received into its buffer, or can inspect the variable Packet_Data_Size, which informs the printer as to the data quantity of each packet, and is contained in the packet header for each packet transmitted from host computer 26.

It will be understood that the host computer-printer combination of the present invention is designed to be used with rasterized bitmap data being transmitted from the host computer to the printer. In addition, for an optimal system, it is assumed that there is a direct connection between the host computer and the printer, rather than a network connection. Even where a direct connection between the host and printer is possible for a given printing system, it is preferred that the printer driver program residing on the host computer have a feature that disables any automatic timed backups that are performed by the host for its "open" data files. Otherwise, a timed backup could severely impact the effective data transmission rate of the print data emanating from the host.

The principles of the present invention can also apply to a situation where the print data transmitted from the host computer is in a high level language, or the host computer transfers data to the printer via a network. However, as will be understood by one of ordinary skill in the art, a high level language that could utilize the principles of the present invention would need to provide its print data in a "top-down" orientation as it describes the page that will be rasterized and printed. Furthermore, for this invention to successfully work in a network environment, there would need to be some assurance that the network would give priority to the data packets attempting to be sent from the host computer-at least until the entire page of data had been sent in however many packets are required to define that page-before releasing the "token" from this host to a different host computer on the network.

As related above, printer 10 operates in a parallelized manner in which it performs two functions virtually simultaneously. After printer 10 receives a certain amount of print data for a particular page, it will command its print engine 36 to begin transporting the print media (e.g., a sheet of paper) and to begin printing that page of print media while the remaining print data for that same page is still being received at the printer's input port from a host computer. If the data transfer rate between the host computer and printer is greater than the data consumption rate at the printer's printhead, then this parallel system will work just fine. However, in many (if not most) situations, the data transfer rate is slower than the data consumption rate, which causes a race to occur to see if the printer can accumulate the entire page of data from the host computer over the communication link before that same data is needed by the printhead of the printer's print engine 36. If the printer loses this race, an error state will occur, known as a "link overrun."

To ensure that the printer wins this race, a certain amount of print data will be buffered by the printer for this particular page, before the print media begins to move through the print engine 36. Of course, the important parameter in this system is to determine how much data needs to be buffered before allowing the print media to begin moving through the print engine. If a very large amount of data is buffered, the communications link will likely not lose this race and the page will be successfully printed, however, the efficiency is lost. If an insufficient amount of data is buffered, a link overrun condition will more likely occur.

Figure 3:
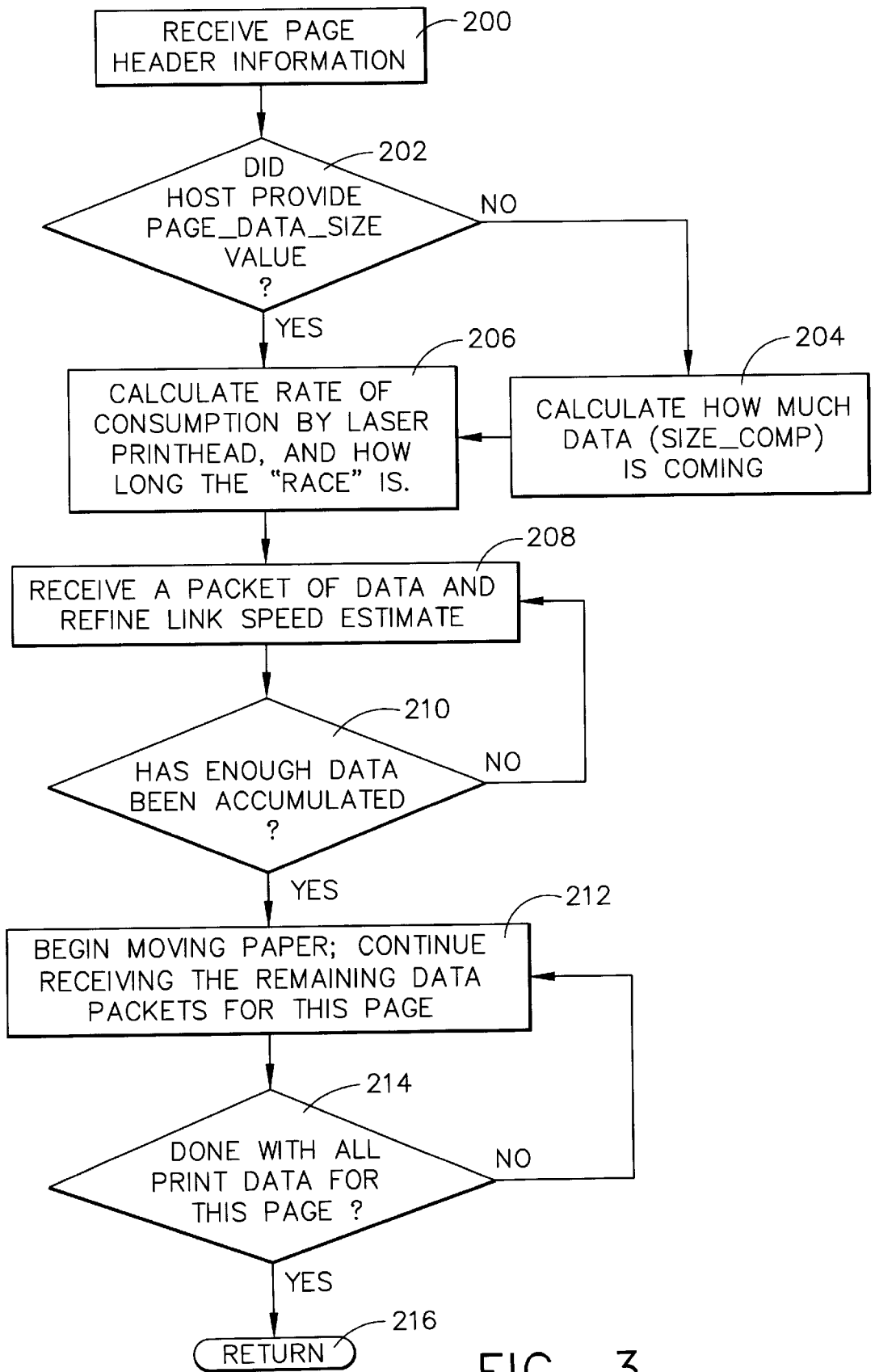
FIG. 3 is a block diagram of the logical operations of the printer of FIG. 1, as related to the present invention.

FIG. 3 is a flow chart that describes the important logical operations of printer 10 when receiving each page of print data from host computer 26. Beginning at a function block 200, the page header information is received at printer 10 from host computer 26. As related above, the page header includes certain parameters that allow the printer to determine what the paper transport speed shall be for this particular page to be printed, and also allows the printer to calculate the vertical height of the actual bitmap to be printed on this sheet of print media. This information is always available, whether the printer is operating in Mode 1 or Mode 2.

At a decision block 202, the printer determines whether or not the host computer provided the value for the variable Page_Data_Size. This information will ostensibly be provided as part of the page header. If this variable has a positive numeric value, then that will represent the actual size in Kbytes of the compressed data for this entire page. If the value is equal to negative one ("−1") then the host computer is not providing this data value. It will be understood that, while the printer driver program may desire to provide an actual numeric value in Kbytes for this parameter, it may depend upon the manufacture and version of the word processing program as to whether or not this information can actually be determined at host computer 26, and then provided to printer 10.

Assuming the result is NO at decision block 202, the printer will be operating in Mode 1, and the logic flow is directed to a function block 204. This will be the general case for host computers that do not have appropriate software and drivers to provide the information needed to give the actual Kbyte value for the Page_Data_Size variable. At function block 204 the printer calculates how much data is coming from the host computer for this particular page, and places this calculated value into a variable named "Size_COMP" (which will be an acronym for the size of the compressed data for this page). This information is required so the printer can be informed as to how "large" the bitmap will be for this particular sheet of print media to print this page.

The "Size_Variable" is an estimate that is determined (in Mode 1) from some of the page header information, such as the paper size (which gives the maximum width of the printed line), the print resolution (for both the X and Y directions), and the vertical length of the area that will be printed with black pels (from the top margin of the page and the Y-extent of the page). This information listed just above will give an idea as to the uncompressed size of the bitmap, however, this is not the same information as is needed to determine the value of the variable Size_COMP. The uncompressed bitmap data size for a particular page is given the variable name "Size_UNCOMP," and that data value divided by the compression ratio will provide the value for the variable Size_COMP.

The compression ratio value is typically not provided by the host computer, so the printer must assume an estimated compression ratio value. This value should be a relatively conservative number, for if a compression ratio is assumed having a value that is too large, then the uncompressed bitmap that must be generated to print the page will in reality be larger than expected, and a link overrun could occur if the print engine's data consumption rate allows the bitmap to be finished for this page before all of the necessary data becomes resident in the printer. The compression ratio will likely be in the range of 2.8 to 3.2 for an entire page of print data for a relatively low-power microprocessor-based printer system. It is preferred that the assumed compression ratio (referred to herein as the variable "$\lambda$") be set to the value 2.8. Of course, if the printer is operating in Mode 2, the exact size of the compressed data (i.e., the variable Size_COMP) will be provided by host computer 26, although the compression ratio $\lambda$ will not necessarily be known, unless the host computer also can provide that piece of information.

If the result at decision block 202 was YES, then the printer-host computer system is operating in Mode 2, and the value of the variable Page_Data_Size will be directly provided by the host computer as part of the page header information. When using Mode 2, the amount of data that should be buffered by the printer before initiating operation of the print engine for this particular page is given by the equation:

$$b = d - [t(s,1)*r]$$

Where:
"d" is the total amount of data being sent by host computer 26 for this page (and is equivalent to the variable Page_Data_Size),
"s" is the transport speed of the print media through the print engine,
"1" is the vertical distance of the area to be printed on this particular page,
"t(s,1)" is the amount of time the printed area will be moving past the printhead, as a function of the process speed and vertical extent of the printed area of the page, and
"r" is the data transfer rate between the host computer and the printer.

Some of the above quantities are calculated by steps of the flow chart in FIG. 3 below decision block 202. At a function block 206, the rate of consumption by the laser printhead is calculated as well as the length of time the printed area will be moving past the printhead. The consumption rate of the printhead-in terms of bytes per second over the communications link between the host computer and the printer-can be approximated by the following equation:

$$c = (r_x * r_y * p * w)/8/\lambda,$$

Where:
"$r_x$" is the X-resolution in bits per inch,
"$r_y$" is the Y-resolution in bits per inch,
"p" is the process speed of the print engine in inches per second,
"w" is the width of the sheet in print media in inches,
"$\lambda$" is the estimated compression ratio, and
"8" is a constant to convert from bits to bytes.

The reason this calculation for the consumption rate "c" is an approximation is that the compression ratio $\lambda$ is only an estimation of the actual compression ratio, unless the host computer 26 has actually provided the precise value as part of the page header information. In general, this will not be the case, and the printer must create its own estimated compression ratio, which preferably is equal to the value of 2.8, as noted above.

The length of time for the "race" is essentially equal to the amount of time t(s,1) that the printed area will be moving past the printhead. Of course, once the last row of dots to be placed on the print media has moved past the printhead, the race will either have been lost or won. If all of the data for this particular page has been transferred to host computer 26 into printer 10 and was made available to the printhead in time to print the last row of black pels, then the race will have been won. Although the calculation to determine the time for the race is relatively straightforward (i.e., the race time is equal to the transport speed "s" divided by the vertical distance of the area to be printed "1"), the determination of the amount of data that is to be buffered before starting the printhead for this page requires further approximations when utilizing Mode 1, where the host computer does not provide the value of the total amount of data "d" (i.e., the variable Page_Data_Size), and also in Mode 2 where this value for d is provided by the host.

In calculating the amount of data to be buffered before starting the print engine, the data transfer rate also must be considered, which is also known as the "link speed." At a function block 208, a packet of print data is received, and the link speed estimate is refined. This link speed is essentially the same quantity as the data transfer rate "r," and is equal to the number of data bytes received so far, divided by the time to receive those bytes. Every time a new packet of print data is received for this page, the new number of received bytes is added to the numerator and the additional amount of time to receive these bytes is added to the denominator, and a new link speed estimate is calculated.

A decision block 210 now determines if enough data has been accumulated into the printer's buffer. In Mode 2, the number of bytes to be buffered is determined by the equation: {b=d−[t(s,1) * r]}, as described above. In Mode 1, however, the number of bytes to be buffered is calculated by the following equation:

$$b = t(s,1)*[c-r]$$

Where:
"t(s,1)" is the amount of time the printed area will be moving past the printhead (the same quantity as described for Mode 2 of operation), "c" is the consumption rate of the printhead as a function of the compression ratio, in units of bytes per second over the communications link, and "r" is the data transfer rate.

In either mode, if the amount of data that has been so far accumulated in the buffer is less than the value of the variable "b", then the result of decision block 210 will be NO, and function block 208 will receive the next packet of print data for this page. On the other hand, if the amount of data that has been accumulated in the printer's buffer is greater than the value for "b" then the result will be YES, and a function block 212 will begin moving the print media through the print engine.

Function block 212 also continues receiving the remaining data packets for this page until a decision block 214 determines that all of the print data for this page has been received at printer 10. Once that occurs, this routine returns at step 216.

In summary, the amount of data that should be buffered before starting the print engine uses an estimate of the link speed between the host computer and printer, an estimate of the total amount of data to be downloaded for this particular page, and an estimate of the amount of time that is available to perform the data transfer (i.e., how long the "race" is before the printhead passes over the last row of black pels to be printed). In a preferred embodiment, the size of each data packet (i.e., the value of the variable Packet_Data_Size) will be approximately 50 Kbytes, and as each packet is received, stored, and acknowledged by the printer, the amount of time to do so is measured by the printer, thereby leading to the approximate data transfer rate which provides the estimate of the link speed. This link speed estimate is not carried over from page-to-page, but instead is recalculated for each page. A value for the link speed is needed in determining the amount of data that should be buffered by the printer whether the printer is using Mode 1 or Mode 2. Of course, when using Mode 1, the printer must also determine for itself the consumption rate of the printhead, which is in units of bytes per second, and the total size of the print data for this page, which is in units of bytes. In Mode 1, the consumption rate minus the data transfer rate is multiplied by the amount of time the printed area will be moving past the printhead, thereby giving a value in bytes which is the quantity of data to be buffered in the printer before starting the print engine.

In Mode 2, the consumption rate of the printhead is not required to be calculated by the printer, since the host computer directly provides the value that represents the total amount of data to be transferred (in bytes) for an entire page to be printed. The calculation to be performed by the printer in Mode 2 is relatively simple, which is equal to the total amount of data for this page minus the quantity: {the amount of time the printed area will be moving past the printhead (in seconds) times the data transfer rate (in bytes per second)}.

To more clearly understand the invention, a few examples of pages to be printed are provided below. In a first example, the printed area page height is 6.5", the printed area page width is 5.5", the X-resolution is 600 dpi, and the Y-resolution is also 600 dpi. All of this information so far can be gleaned from the page header that is always provided by a host computer to a printer. From this information, the size of the uncompressed data can be calculated by multiplying the height times width times the X and Y resolutions, and dividing by the numeral "8" (bits per bytes), which in this example provides a bitmap data size of 1.6 Mbytes. This is also equivalent to a variable named "Size_UNCOMP." The size of the compressed bitmap will then by 1.6 MB divided by an assumed compression ratio of 3.0, giving 533 Kbytes for the variable Size_COMP.

Assuming a print engine transport speed of 1.3" per second (which for this printer is determined by the resolution of 600 dpi from the page header information), and a compression ratio of 3.0, the consumption rate of the compressed data being transferred from the host computer is equal to the quantity:

$$1.3*600*600*8.5"/8/3.0=165 \text{ KB/sec}$$

In this example, the link speed between the computer and printer is assumed to be 140 KB/sec, leading to a determination of the amount of data to be buffered in the printer before starting the print engine (in Mode 1 of operation) of:

$$(1/s)*(c-r)=(6.5/1.3)*(165K-140K)=125 \text{ KB.}$$

In another example, the printed area page height is 3.75" the printed area page width is 5.5", the X-resolution is 600 dpi, and the Y-resolution is also 600 dpi. This information gleaned from the page header provides the size of the uncompressed data bitmap, which is 928 Kbytes. Using an assumed compression ratio of 3.0, an estimate of the size for the compressed data=928 KB divided by 3.0=307 KB.

Assuming again a transport speed of 1.3" per second through the print engine, the consumption rate for the compressed data is equal to:

$$1.3*600*600*8.5"/8/3.0=165 \text{ KB.}$$

If the link speed between the host and printer in this example is 135 KB/sec the amount to be buffered before starting the print engine will be equal to the quantity:

$$(3.75/1.3)(165K-135K)=86 \text{ KB}$$

In this second example, since the vertical extent of the printed area was so small, the amount needed to be buffered in advance of starting the print engine was also a relatively small number. It would be a waste of time and buffer space to always fill a "fixed" buffer size of, for example, 300 Kbytes before starting the print engine for the page, which would be one alternative mode of operating a printer in parallel to initiate the operation of the engine before the entire amount of data for the page has been received.

The present invention could also be made more sophisticated by taking into account the position on the physical page of the first printed pel. It will be understood that, the lower on the page for this first printed pel, the more time the printer has in filling the buffer with print data for this page before the printhead consumes any data after the paper starts to move. Therefore, the print engine could be started even earlier (i.e., a smaller amount of data could be buffered in the printer before initiating the print engine's paper transport mechanism), thereby leading to an even more efficient printer design. Such a more sophisticated approach would merely need to take into account the amount of time required to transport the paper from the top page edge to the first row of black pels to be printed, and set the variable "c" to zero to show the effect of the lack of data consumption by the printhead during the amount of time this non-printed area would be moving past the printhead (while simultaneously adding new data packets of print data into the printer's buffer).

In a third example of a page to be printed, the printed area page height is 9.0", the printed area page width is 7.5", the X-resolution is 600 dpi and the Y-resolution is also 600 dpi. This leads to a bitmap size for the uncompressed data of 3.04

Mbytes, which provides an estimate of the compressed data size of 3.04 MB/3.0=1.01 MB, assuming a compression ratio of 3.0.

The transport speed is again 1.3" per second, which provides a calculated consumption rate for the compressed data of:

$$1.3*600*600*8.5"/8/3.0=165 \text{ KB}.$$

Assuming an even slower link speed between the host and the printer of 125 KB/sec the amount to be buffered for starting the print engine is equal to the following quantity:

$$(9.0/1.3)*(165K-125K)=277 \text{ KB}.$$

One obvious factor that drives the amount of data to be buffered to a much greater number is the larger vertical height to be printed, which means that the laser printhead will be consuming data for most of the overall surface area of the page or sheet of print media that is being printed. Since the printhead is going to be rather busy to print this particular page, it is easy to see that a much larger chunk of print data will need to be buffered before allowing the print engine to actually start moving the paper.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. In a serialized constant-velocity page printing system having a memory circuit containing a receive buffer, a communications port that is effectively connected to at least one external device, a print engine, and a processing circuit, a method of efficiently printing a page of print data, said method comprising:
   (a) for each page to be printed, calculating a threshold value related to a quantity of print data at said printing system, without receiving a data value from any one of said at least one external device that would directly set a pre-determined value corresponding to said threshold value of print data, wherein said calculation includes evaluating an actual data transfer rate from said external device through said communications port, as measured by said constant-velocit page printing system;
   (b) receiving print data from said at least one external device via said communications port for a portion of a particular page of a print job until said threshold value of print data has been received into said receive buffer; and
   (c) after detecting that said threshold value of print data has been received, commanding said print engine to begin printing said particular page, at a print engine transport speed that is determined only by a print resolution for said particular page, before all of the print data for said particular page has been received by said printing system, wherein said threshold value of print data represents a value less than the amount of print data corresponding to the entire particular page.

2. The method as recited in claim 1, further comprising the step of continuing to receive print data from said at least one external device via said communications port for the remaining portion of said particular page while said print engine continues to print the same particular page.

3. The method as recited in claim 1, wherein during said step of determining the threshold value of print data at said printing system, said determination includes an evaluation of (i) the amount of time an area to be printed will be moving past a printhead of said print engine, and (ii) a consumption rate of said printhead.

4. The method as recited in claim 3, wherein said amount of time for an area to be printed while moving past a printhead of said print engine is a function of process speed and vertical length of printed area, and said consumption rate of said printhead is a function of compression ratio of said print data.

5. The method as recited in claim 3, wherein said threshold value of print data "b" is determined by the equation:

$$b=t(s,1)*[c-r]$$

where:
"s" is the transport speed of the print media through the print engine,
"1" is the vertical distance of the area to be printed on this particular page,
"t(s,1)" is the amount of time the printed area will be moving past the printhead,
"c" is the consumption rate of the printhead as a function of the compression ratio, in units of bytes per second over the communications link, and
"r" is the data transfer rate.

6. The method as recited in claim 5, wherein said consumption rate "c" is determined by the equation:

$$c=(r_x*r_y*p*w)/8/\lambda,$$

where:
"$r_x$" is the X-resolution in bits per inch,
"$r_y$" is the Y-resolution in bits per inch,
"p" is the process speed of the print engine in inches per second,
"w" is the width of the sheet in print media in inches,
"$\lambda$" is the estimated compression ratio, and
"8" is a constant to convert from bits to bytes.

7. A printing apparatus, comprising:
   (a) a memory circuit, said memory circuit containing a receive buffer having a plurality of memory registers;
   (b) a communications port that is effectively connected to at least one external device and to said memory circuit, said communications port providing data from said at least one external device to said receive buffer; and
   (c) a processing circuit that is configured to control the flow of data between said memory circuit and said communications port, said processing circuit also being configured to calculate a threshold value related to a quantity of print data for each particular page of a print job, and to detect that said threshold value of print data has been received into said receive buffer, then initiating a command to a print engine to begin physically printing said particular page, at a print engine transport speed that is determined only by a print resolution for said particular page, wherein:
      said calculation includes an evaluation of (i) the amount of time an area to be printed will be moving past a printhead of said print engine, (ii) a consumption rate of said printhead, and (iii) an actual data transfer rate from said external device through said communications port, as measured by said printing apparatus.

8. The printing apparatus as recited in claim 7, wherein said amount of time for an area to be printed while moving past a printhead of said print engine is a function of process speed and vertical length of printed area, and said consumption rate of said printhead is a function of compression ratio of said print data.

9. The printing apparatus as recited in claim 7, wherein said threshold value of print data "b" is determined by the equation:

$$b=t(s,1)*[c-r]$$

where:
- "s" is the transport speed of the print media through the print engine,
- "1" is the vertical distance of the area to be printed on this particular page,
- "t(s,1)" is the amount of time the printed area will be moving past the printhead,
- "c" is the consumption rate of the printhead as a function of the compression ratio, in units of bytes per second over the communications link, and
- "r" is the data transfer rate.

10. The printing apparatus as recited in claim 9, wherein said consumption rate "c" is determined by the equation:

$$c=(r_x*r_y*p*w)/8/\lambda,$$

where:
- "$r_x$" is the X-resolution in bits per inch,
- "$r_y$" is the Y-resolution in bits per inch,
- "p" is the process speed of the print engine in inches per second,
- "w" is the width of the sheet in print media in inches,
- "$\lambda$" is the estimated compression ratio, and
- "8" is a constant to convert from bits to bytes.

11. A printing apparatus, comprising:
(a) a memory circuit, said memory circuit containing a receive buffer having a plurality of memory registers;
(b) a communications port that is effectively connected to at least one external device and to said memory circuit, said communications port providing data from said at least one external device to said receive buffer; and
(c) a processing circuit that is configured to control the flow of data between said memory circuit and said communications port, said processing circuit also being configured to calculate a threshold value related to a quantity of print data for each particular page of a print job, and to detect that said threshold value of print data has been received into said receive buffer, then initiating a command to a print engine to begin physically printing said particular page, at a print engine transport speed that is determined only by a print resolution for said particular page, wherein:
said calculation includes an evaluation of (i) the amount of time an area to be printed will be moving past a printhead of said print engine, (ii) a data message received from said at least one external device that informs said processing circuit the total amount of print data for said particular page, and (iii) an actual data transfer rate from said external device through said communications port as measured by said printing aparatus.

12. The printing apparatus as recited in claim 11, wherein said amount of time for an area to be printed while moving past a printhead of said print engine is a function of process speed and vertical length of printed area.

13. The printing apparatus as recited in claim 11, wherein said threshold value of print data "b" is determined by the equation:

$$b=d-[t(s,1)*r]$$

where:
- "d" is the total amount of data being sent by computer 26 for this page,
- "s" is the transport speed of the print media through the print engine,
- "1" is the vertical distance of the area to be printed on this particular page,
- "t(s,1)" is the amount of time the printed area will be moving past the printhead, and
- "r" is the data transfer rate between the host computer and the printer.

14. The method as recited in claim 1, further comprising: measuring said actual data transfer rate only after receiving at least one data packet for said particular page.

15. The printing apparatus as recited in claim 7, wherein said actual data transfer rate measurement occurs only after said printing apparatus has received at least one data packet for said particular page.

16. The printing apparatus as recited in claim 11, wherein said actual data transfer rate measurement occurs only after said printing apparatus has received at least one data packet for said particular page.

* * * * *